(12) United States Patent
Tanabe

(10) Patent No.: US 8,183,828 B2
(45) Date of Patent: May 22, 2012

(54) CHARGING APPARATUS

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 12/399,641

(22) Filed: Mar. 6, 2009

(65) Prior Publication Data

US 2009/0224723 A1 Sep. 10, 2009

(30) Foreign Application Priority Data

Mar. 7, 2008 (JP) ................................. 2008-057309

(51) Int. Cl.
*H02J 7/00* (2006.01)
*H05K 7/04* (2006.01)
*H01F 27/42* (2006.01)

(52) U.S. Cl. ........ 320/108; 320/115; 320/109; 361/807; 307/104

(58) Field of Classification Search .................... 320/108
See application file for complete search history.

(56) References Cited

U.S. PATENT DOCUMENTS

| | | | |
|---|---|---|---|
| 7,443,135 B2 * | 10/2008 | Cho ............................. | 320/108 |
| 7,948,208 B2 * | 5/2011 | Partovi et al. ................. | 320/108 |
| 7,952,322 B2 * | 5/2011 | Partovi et al. ................. | 320/108 |
| 2002/0063124 A1 * | 5/2002 | Clothier et al. ............... | 219/622 |
| 2006/0071632 A1 * | 4/2006 | Ghabra et al. ................. | 320/108 |
| 2006/0158152 A1 * | 7/2006 | Taniguchi et al. ............. | 320/106 |
| 2007/0069687 A1 | 3/2007 | Suzuki | |
| 2007/0228833 A1 | 10/2007 | Stevens et al. | |
| 2007/0279002 A1 * | 12/2007 | Partovi .......................... | 320/115 |
| 2008/0094027 A1 * | 4/2008 | Cho .............................. | 320/108 |
| 2009/0079270 A1 * | 3/2009 | Jin ................................ | 307/104 |
| 2009/0096413 A1 * | 4/2009 | Partovi et al. ................. | 320/108 |
| 2009/0140691 A1 * | 6/2009 | Jung ............................. | 320/108 |

* cited by examiner

*Primary Examiner* — Yalkew Fantu
(74) *Attorney, Agent, or Firm* — Canon USA Inc IP Division

(57) ABSTRACT

A charging apparatus includes: a charging unit configured to perform a contactless charging operation for a placed external device; a detector configured to detect a position of a placed object; a determining unit configured to determine that the placed object is an external device compatible with the charging unit; and a control unit configured to control the charging unit such that, during the contactless charging operation for an external device compatible with the charging unit, the charging operation for the external device being charged is restricted when an object that is determined by the determining unit not to be an external device compatible with the charging unit, has been placed within a predetermined distance from the charging unit.

17 Claims, 6 Drawing Sheets

CHARGING APPARATUS

BACKGROUND OF THE INVENTION

1. Field of the Invention

The present invention relates to a charging apparatus, and in particular to a charging apparatus that provides electric power to external devices using electromagnetic induction.

2. Description of the Related Art

Contactless charging apparatuses that use electromagnetic induction have been known. Such charging apparatuses utilize the principle of electromagnetic induction in which a magnetic field generated by an electric current flowing in a primary coil provided in a charging apparatus causes a voltage to be generated across both ends of a secondary coil provided in an external device. In these charging apparatuses, when a foreign object such as a piece of metal (for example, a coin) is placed within the magnetic field generated by the primary coil, an eddy-current flowing in the piece of metal may cause heat to be generated due to the internal resistance of the piece of metal.

To address such a problem, a charging apparatus has been proposed (for example, US 2007/0069687) that does not activate a charging circuit of the charging apparatus until it detects that a chargeable device has been placed on the charging apparatus, by means of authentication using a contactless IC card.

However, the charging apparatus described above does not take into consideration a case in which a plurality of devices are being charged in parallel. Hence, when a chargeable device and a non-chargeable device are placed on the charging apparatus at the same time, for example, there remains a problem in which a charging operation may possibly be started despite the presence of a non-chargeable device on the charging apparatus, causing the non-chargeable device to generate heat.

SUMMARY OF THE INVENTION

The present invention addresses such problems as described above, and provides a charging apparatus that can suppress heat generation even when a non-chargeable device or a foreign object is placed together with a chargeable device on the charging apparatus.

According to an aspect of the present invention, a charging apparatus includes a charging unit configured to perform a contactless charging operation for a placed external device; a position detector configured to detect a position of a placed object; a determining unit configured to determine whether the placed object is not an external device compatible with the charging unit; and a control unit configured to control the charging unit such that, during the contactless charging operation for an external device compatible with the charging unit, the charging operation for the external device being charged is restricted when an object that is determined by the determining unit not to be an external device compatible with the charging unit, has been placed within a predetermined distance from the charging unit.

Further features of the present invention will become apparent from the following description of exemplary embodiments with reference to the attached drawings.

DESCRIPTION OF THE EMBODIMENTS

Embodiments of the present invention will be described in detail with reference to the attached drawings. A charging apparatus that can charge a plurality of devices will be described. Note that DC means direct current and AC means alternating current, hereinafter.

Figure 1:
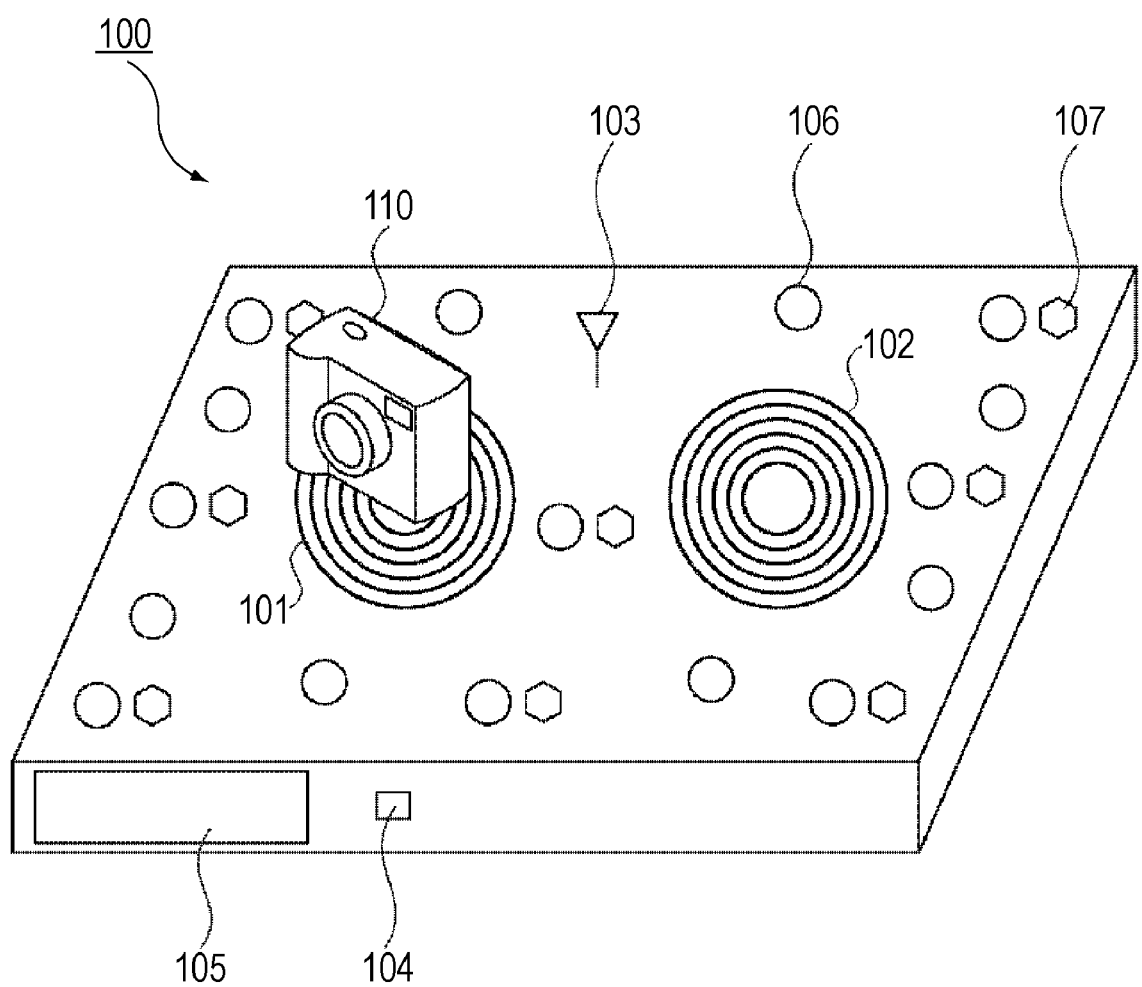
FIG. 1 is a perspective view of a structure of a charging apparatus according to a first embodiment of the present invention.

FIG. 1 shows a structure of a charging apparatus according to a first embodiment. A charging apparatus 100 includes two coils 101 and 102. A magnetic field generated by passing a current through each of the coils 101 and 102 causes a voltage to be generated, due to electromagnetic induction, across both ends of a coil in a device to be charged that is placed above the coil 101 or 102. The coils 101 and 102 may be exposed or may be covered with an outer case made of a non-conductive material such as plastic or a resin.

The charging apparatus 100 also includes an IC communication unit 103 used to communicate with an IC tag provided in a device being charged that is placed on the charging apparatus 100. An IC chip within the IC tag provided in the device being charged records therein information indicating that the device being charged is a device that can be charged with the charging apparatus 100 of the present embodiment. The IC communication unit 103 receives the information indicating the chargeability of the device, and determines whether or not the information indicates that the device is chargeable with the charging apparatus 100. The IC communication unit 103 may be either exposed or housed in the outer case.

The charging apparatus 100 further includes a light emitting device (LED) 104 and a liquid crystal display (LCD) panel 105, used for notifying a user of such occurrences as a charging error, a change in state of charging, and the completion of charging.

The charging apparatus 100 is also provided with a plurality of temperature sensors such as thermistors 106 used for sensing temperatures, and a plurality of magnetic sensors such as Hall elements 107 used for sensing an object. The thermistors 106 and the Hall elements 107 may be either exposed or disposed under an outer case having a high thermal conductivity.

Referring to FIG. 1, a digital camera 110 is placed at a position corresponding to the coil 101 of the charging apparatus 100. The digital camera 110 includes a coil and an IC tag that records information indicating that the camera 110 is a device chargeable with the charging apparatus 100 according to the present embodiment. The digital camera 110 can charge a secondary battery within the camera 110 using the principle of electromagnetic induction. Here, the digital camera 110 is assumed to include an IC tag and a coil, but an external unit including an IC tag and a coil may be used to charge the digital camera 110. Further, even when a device has no secondary battery within it, the device can be made to operate normally by starting a charging operation.

Referring to FIG. 1, the outline of the charging operation is described.

Although a digital camera is described as a device to be charged, the device may be any electronic device, such as a cellular phone, a portable audio player, a portable game player, or a notebook personal computer.

When the Hall elements 107 sense that the digital camera 110 has been placed above the coil 101, the IC communication unit 103 communicates with the IC tag in the digital camera 110. Specifically, a radio wave transmitted from the IC communication unit 103 is received by the antenna of the IC tag in the digital camera 110, and the IC tag is activated using electromotive force generated due to resonance effect of the antenna. Then information is read out from the IC chip in the IC tag and is transmitted from the antenna of the IC tag. The information read out from the IC chip in the IC tag of the digital camera 110 is received by the IC communication unit 103 of the charging apparatus 100. The information received from the IC tag of the digital camera 110 is used to determine whether or not the device is chargeable. When the received information indicates that the device is chargeable, the device is determined to be chargeable, and when the received information indicates that the device is not chargeable, the device is determined to be non-chargeable. When no information is received even though the IC communication unit 103 started communication (for example, when an object with no IC tag is placed or when activation of an IC tag fails), the device is determined to be non-chargeable. The operation described above is called "IC authentication" hereafter in the present embodiment.

When the result of "IC authentication" shows that the information received from an IC tag indicates a chargeable device, a current is passed through the coil 101, which generates a magnetic field.

The coil built into the digital camera 110 charges the secondary battery utilizing electromotive force due to the magnetic field generated in the coil 101.

Alternatively, the generated electromotive force may be used to provide power to be consumed by the digital camera 110 during normal operation, instead of being used for charging the secondary battery.

The system configuration of the charging apparatus 100 according to the present embodiment will now be described.

Figure 2:
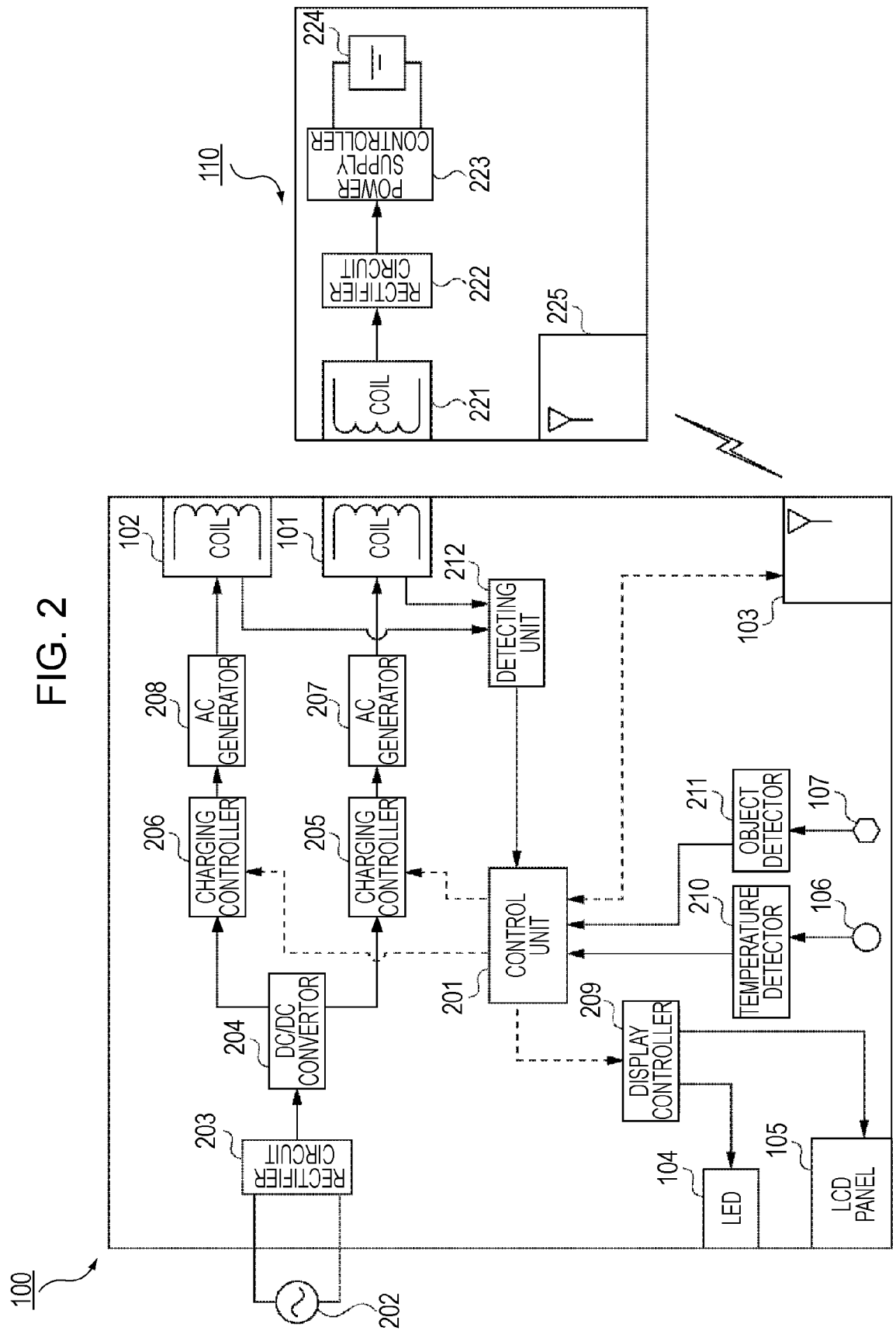
FIG. 2 is a block diagram of the charging apparatus according to the first embodiment of the present invention.

FIG. 2 shows block diagrams of the charging apparatus 100 according to the present embodiment and a charging circuit of the digital camera 110.

The charging apparatus 100 includes the coils 101 and 102, the IC communication unit 103, the LED 104, the LCD panel 105, the thermistors 106, and the Hall elements 107. The charging apparatus 100 also includes a control unit 201 that controls each of its blocks. The charging apparatus 100 also includes, as circuits for feeding the coils 101 and 102, a commercial-power-supply input unit 202, a rectifier circuit 203, a DC/DC converter 204, charging controllers 205 and 206, and AC generators 207 and 208. The charging apparatus 100 also includes a display controller 209 that controls the display operation of the LED 104 and the LCD panel 105. The charging apparatus 100 also includes a temperature detector 210 that sends temperature values sensed by the thermistors 106 to the control unit 201 and an object detector 211 that detects the strengths of magnetic fields at positions where the Hall elements 107 are located and sends information on the presence or absence of an object to the control unit 201. The charging apparatus 100 also includes a detecting unit 212 that detects voltages and/or currents of the coils 101 and 102.

In the present embodiment, the input AC from a commercial power supply is converted to a DC in the charging apparatus 100, but this conversion may be performed by an AC adapter etc. connected to the charging apparatus 100.

The digital camera 110, which is a device to be charged, has a block for a charging operation including a coil 221, a rectifier circuit 222, a power supply controller 223, a secondary battery 224, and an IC tag 225.

Referring to FIG. 2, a normal charging operation of the present embodiment will now be described.

When the digital camera 110 is placed on the charging apparatus 100, the object detector 211, receiving signals indicating changes in magnetic field sensed by the Hall elements 107, detects the position of an object and notifies the control unit 201 of the placement and the position of the object. Then the IC communication unit 103 is controlled by the control unit 201 to start "IC authentication". The IC communication unit 103 performs "IC authentication" of the IC tag of the digital camera 110, and determines whether or not the placed object is a chargeable device.

When it is determined, as the result of the "IC authentication", that a chargeable device has been placed, the IC communication unit 103 notifies the control unit 201 that a chargeable device has been placed.

As for a power supply, an AC voltage from the commercial-power-supply input unit 202 is rectified by the rectifier circuit 203 to produce a DC voltage to be applied to the DC/DC converter 204. The DC/DC converter 204 converts the input DC voltage to a predetermined voltage, which is applied to the charging controllers 205 and 206.

The control unit 201, when notified by the IC communication unit 103 that a chargeable device has been placed, controls the charging controllers 205 and 206 that receive the DC voltage provided from the DC/DC converter 204, such that DC voltages are applied to the AC generators 207 and 208. Here, the control unit 201 controls the currents and/or voltages supplied to the AC generators 207 and 208, by controlling the charging controllers 205 and 206. The AC generators 207 and 208 convert the input DC voltages to AC voltages, which are applied to the coils 101 and 102. The coils 101 and 102 generate AC magnetic fields in accordance with the applied AC voltages. The digital camera 110 includes a charging mechanism. The AC magnetic field generated by the coil 101 causes an AC voltage to be generated across both ends of the coil 221 provided in the digital camera 110. The generated AC voltage is rectified by the rectifier circuit 222 of the digital camera 110, and the obtained DC voltage is applied to the power supply controller 223, which charges the secondary battery 224.

A normal charging operation is thus performed.

Figure 3:
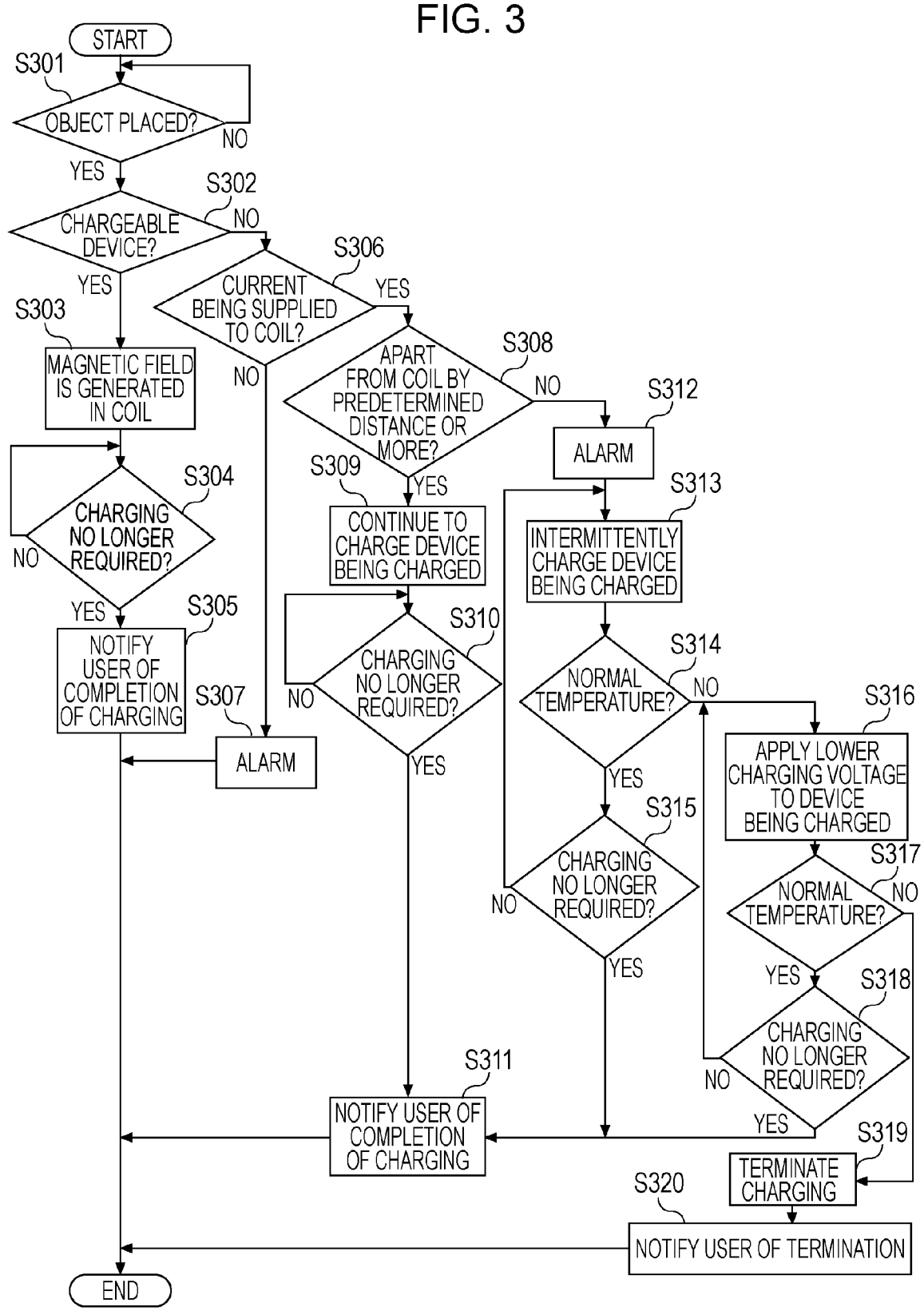
FIG. 3 is a flowchart showing the steps of a charging operation of the charging apparatus according to the first embodiment of the present invention.

Referring to FIGS. 2 and 3, a method for controlling a charging operation according to the present embodiment will now be described.

FIG. 3 is a flowchart showing the steps of a charging operation according to the present embodiment.

The charging apparatus 100 performs "IC authentication" when it detects that an object has been placed (YES in step S301). When the object is determined to be a chargeable device as the result of the "IC authentication" (YES in step S302), the control unit 201 causes AC magnetic fields to be generated in the coils 101 and 102, by controlling the charging controllers 205 and 206 (step S303). The AC magnetic fields generated in the coils 101 and 102 enable charging to be performed inside the placed chargeable device.

The detecting unit 212, during the charging, continues to send the current and voltage data of the coils 101 and 102 to the control unit 201. When the device being charged no longer needs to be charged since, for example, the charging has finished, the power consumed in the device being charged drops, which leads to a drop in current of the corresponding coil. In the present embodiment, for example, the power supply controller 223 monitors the voltage of the secondary battery 224, and when it detects that the voltage has reached a predetermined voltage, suppresses the requirement for power. This leads to a drop in current of the corresponding coil 101. The control unit 201, which detected a drop in current of the coil 101 and/or the coil 102, determines that charging is no longer required. When a drop is not observed, it is determined that charging is still required (step S304).

When it is determined that charging is no longer required (YES in step S304), the control unit 201 controls the charging controllers 205 and 206 such that supplying of power to the coils 101 and 102 is stopped, and instructs the display controller 209 to notify a user of completion of the charging operation. The display controller 209 makes the LED 104 blink, be turned on, or change the luminescent color; or makes the LCD panel 105 display a completion-of-charging message, for example (step S305). The completion of charging may be notified by means of display as described above, or may be notified by means of an audio message using a loudspeaker (not shown) etc.

When the object is determined to be a non-chargeable device as the result of the "IC authentication" (NO in step S302), the control unit 201 determines whether or not the charging controllers 205 and 206 are in a state of supplying currents to the coils 101 and 102 (step S306). This is equivalent to determining whether or not AC magnetic fields have already been generated in the coils 101 and 102, or determining whether or not a certain chargeable device has already been placed in a state of being charged. An alarm message may be displayed which shows that a non-chargeable device or a foreign object has been placed when the object is determined to be a non-chargeable device as the result of the "IC authentication" (NO in step S302).

When currents are not being supplied to the coils 101 and 102 (NO in step S306), the control unit 201 instructs the display controller 209 to display an alarm showing that a non-chargeable device or a foreign object has been placed (step S307). The display controller 209 makes the LED 104 blink, be turned on, or change the luminescent color to act as an alarm. Likewise, the LCD panel 105 displays a message acting as an alarm. The alarm may be realized by display as described above, or may be an audio message from a loudspeaker (not shown).

When currents are being supplied to the coils 101 and 102 (YES in step S306), the control unit 201 receives the position data of the object from the object detector 211. Then the control unit 201 determines whether or not the newly placed object has been placed apart from the coils 101 and 102 by a predetermined distance or more (step S308). This is equivalent to determining whether or not the newly placed object has been placed within a predetermined distance from the coils 101 and 102. The object detector 211 can perform position detecting, i.e., locating the position of a placed object, by detecting and comparing all the outputs of the Hall elements 107. Here, a predetermined distance means a distance beyond which a newly placed object, if made of metal, is unlikely to be heated due to magnetic fields generated by the coils 101 and 102. It also means a distance within which a newly placed object disturbs electromagnetic induction utilized by a device that is already being charged. This may be determined on the basis of experiments, for example.

When the distance between the newly placed object and the device being charged is a predetermined distance or more (YES in step S308), the control unit 201 controls the charging controllers 205 and 206 such that power is continued to be supplied to the coils 101 and 102 (step S309).

When the device being charged no longer needs to be charged since the charging has finished, for example, the power consumed in the device being charged drops, which leads to a drop in current of the corresponding coil. The control unit 201, which detected the drop in current of the coils 101 and 102, determines that charging is no longer required. When a drop is not observed, it is determined that charging is still required (step S310).

When it is determined that charging is no longer required (YES in step S310), the control unit 201 controls the charging controllers 205 and 206 such that supplying of power to the coils 101 and 102 is stopped, and instructs the display controller 209 to notify a user of completion of the charging operation. The display controller 209 makes the LED 104 blink, be turned on, or change the luminescent color; or makes the LCD panel 105 display a completion-of-charging message, for example (step S311). The completion of charging may be notified by means of display as described above, or may be notified by means of an audio message using a loudspeaker (not shown) etc.

When the distance between the newly placed object and the device being charged is less than a predetermined distance (NO in step S308), the control unit 201 instructs the display controller 209 to display an alarm showing that a non-chargeable device or a foreign object has been placed (step S312). The display controller 209 makes the LED 104 blink, be turned on, or change the luminescent color to act as an alarm. Likewise, the LCD panel 105 displays a message acting as an alarm. The alarm may be realized by display as described above, or may be an audio message from a loudspeaker (not shown).

Then, the control unit 201 controls the charging controllers 205 and 206 such that power is intermittently supplied to the coils 101 and 102. By means of this control, the device being charged can be intermittently charged (step S313). The interval between the intermittent power supplying operations is modifiable. At this time, the control unit 201 may instruct the display controller 209 to notify a user of the intermittent charging by using the LED 104, the LCD panel 105, a loudspeaker (not shown), etc.

Next, the control unit 201 determines whether or not the temperatures of the device being charged and the newly placed object are abnormally high on the basis of temperatures detected by the temperature detector 210 (step S314). The determination is made on the basis of the temperatures sensed by the thermistors 106 that are arranged near the position of the newly placed object detected in step S306. A condition determined to be abnormal may be a temperature equal to or higher than a predetermined value or a rate of increase in temperature equal to or higher than a predetermined value.

When the temperatures detected by the temperature detector 210 are normal (YES in step S314), the control unit 201 determines whether or not more charging is required on the basis of the voltage and current data of the coils 101 and 102 (step S315).

When it is determined that charging is no longer required (YES in step S315), the control unit 201 controls the charging controllers 205 and 206 such that supplying of power to the coils 101 and 102 is stopped, and instructs the display controller 209 to notify a user of completion of the charging operation. The display controller 209 makes the LED 104 blink, be turned on, or change the luminescent color, or makes the LCD panel 105 display a completion-of-charging message, for example (step S311). The completion of charging may be notified by means of display as described above, or may be notified by means of an audio message using a loudspeaker (not shown) etc.

When it is determined that charging is still required (NO in step S315), the control unit 201 controls the charging controllers 205 and 206 such that the intermittent supply of power to the coils 101 and 102 is continued.

When the temperatures detected by the temperature detector 210 are abnormal (NO in step S314), the control unit 201 controls the charging controllers 205 and 206 such that the voltage (charging voltage) applied to the coils 101 and 102 becomes lower than before (step S316). At this time, the control unit 201 may instruct the display controller 209 to notify a user of lower-voltage charging by using the LED 104, the LCD panel 105, a loudspeaker (not shown), etc.

Next, the control unit 201 determines whether or not the temperatures of the device being charged and the newly placed object are abnormally high on the basis of the temperatures detected by the temperature detector 210 (step S317).

When the temperatures detected by the temperature detector 210 are normal (YES in step S317), the control unit 201 determines whether or not more charging is required on the basis of the voltage and current data of the coils 101 and 102 obtained by the detecting unit 212 (step S318).

When it is determined that charging is no longer required (YES in step S318), the control unit 201 controls the charging controllers 205 and 206 such that supplying of power to the coils 101 and 102 is stopped, and instructs the display controller 209 to notify a user of completion of the charging operation. The display controller 209 makes the LED 104 blink, be turned on, or change the luminescent color; or makes the LCD panel 105 display a completion-of-charging message, for example (step S311). The completion of charging may be notified by means of display as described above, or may be notified by means of an audio message using a loudspeaker (not shown) etc.

When the temperatures detected by the temperature detector 210 are abnormal (NO in step S317), the control unit 201 controls the charging controllers 205 and 206 such that supplying of power to the coils 101 and 102 is terminated (step S319), and instructs the display controller 209 to notify a user that the charging operation has been terminated. The display controller 209 makes the LED 104 blink, be turned on, or change the luminescent color; or makes the LCD panel 105 display a termination-of-charging message, for example (step S320). The termination of charging may be notified by means of display as described above, or may be notified by means of an audio message using a loudspeaker (not shown) etc.

Note that the above-described sequence of steps S312 to S315 may be swapped with the above-described sequence of steps S316 to S318. Only one of the sequence of steps S312 to S315 and the sequence of steps S316 to S318 may also be used.

By using the method of controlling a charging operation described above, a charging apparatus according to the present embodiment can suppress heat generation even when a non-chargeable device or a foreign object is placed together with a chargeable device on the charging apparatus. Further, the possibility of unfavorably influencing the charging operation for a chargeable device can be lowered, and a chargeable device, if in a chargeable state, can be charged.

Another embodiment of a charging apparatus is described.

A charging apparatus using two coils was described in the first embodiment. In a second embodiment, a charging apparatus using more coils is described.

Figure 4:
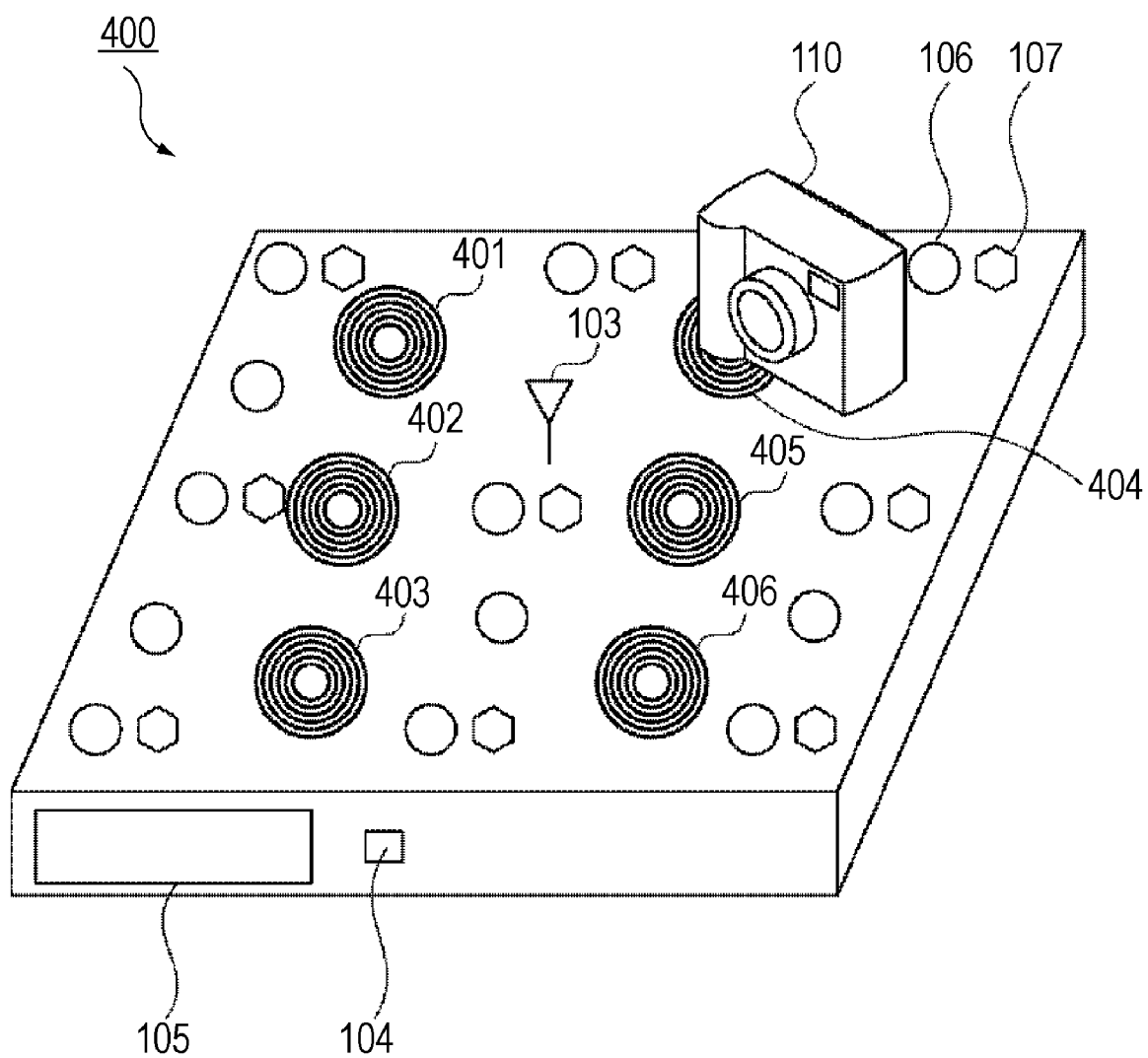
FIG. 4 is a perspective view of a structure of a charging apparatus according to a second embodiment of the present invention.

FIG. 4 shows a structure of a charging apparatus according to the second embodiment. The components of the charging apparatus having functions similar to those of the components of the charging apparatus in the first embodiment are denoted by the same numerals and their descriptions are omitted.

A charging apparatus 400 according to the present embodiment includes coils 401 to 406. These coils cause magnetic fields to be generated by passing currents through them in a way similar to that in the coils of the first embodiment. A voltage is generated, due to electromagnetic induction, across both ends of a coil in a device to be charged that is placed above the coils.

Figure 5:
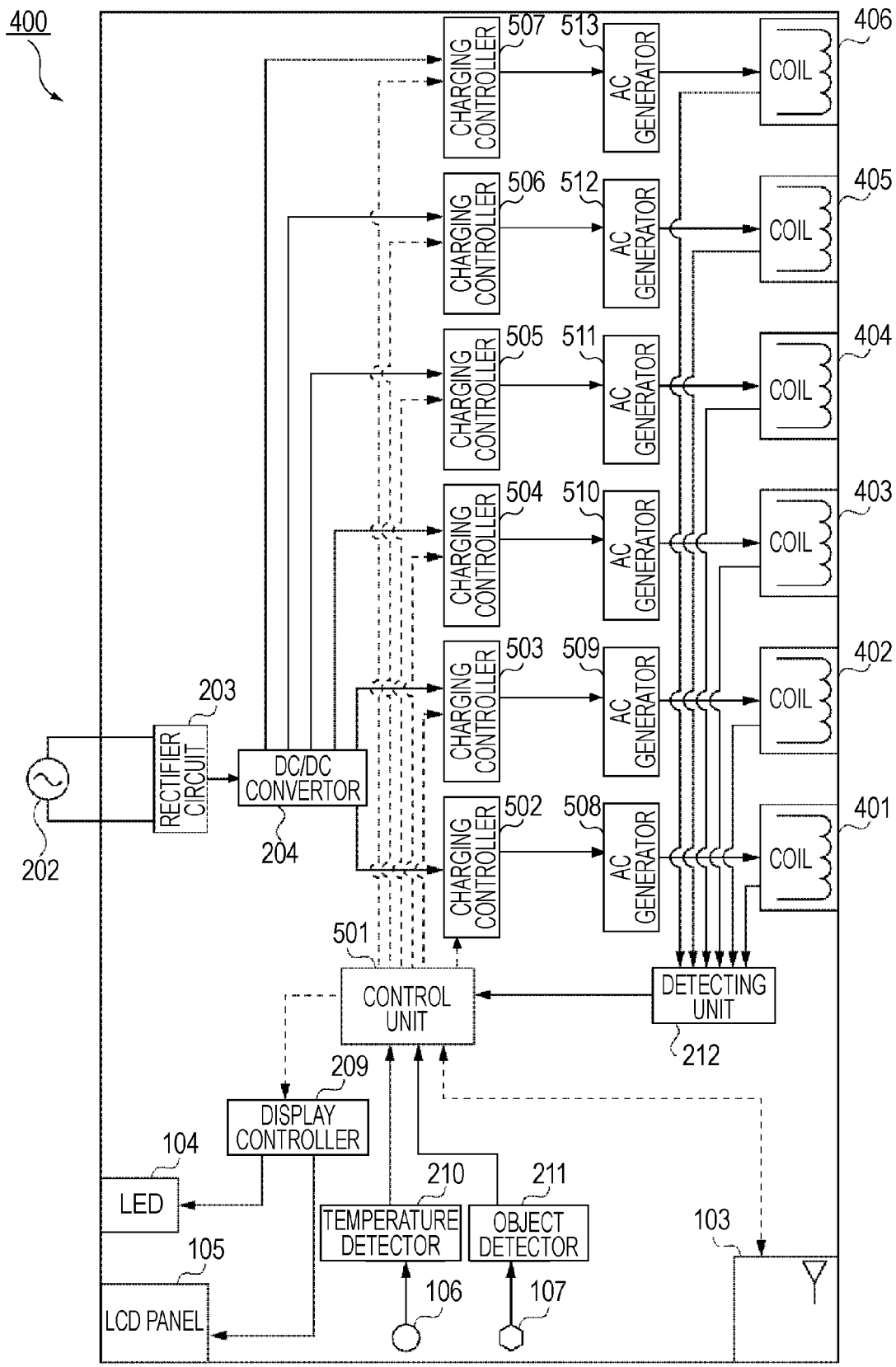
FIG. 5 is a block diagram of the charging apparatus according to the second embodiment of the present invention.

FIG. 5 is a block diagram of the charging apparatus 400 according to the present embodiment. The components having functions similar to those of the components in the first embodiment are denoted by the same numerals and their descriptions are omitted.

Referring to FIG. 5, the charging apparatus 400 includes a control unit 501 that controls each block of the charging apparatus 400. Charging controllers 502 to 507 respectively control currents and/or voltages provided to AC generators 508 to 513. The AC generators 508 to 513 convert the provided DC voltages to AC voltages, which are applied to the coils 401 to 406.

The charging apparatus 400 according to the present embodiment can change which coil power is supplied to in accordance with the position of an object that is detected by the object detector 211. Specifically, the control unit 501 controls the charging controllers 502 to 507 such that power is supplied to a coil near the position of the object detected by the object detector 211. Here, the power may be supplied to a single or a plurality of coils. For instance, in the example shown in FIG. 4, since the position of the digital camera 110 can be detected, a magnetic field can be generated in the coil 404. The charging apparatus 400 of the present embodiment can also charge one device using a plurality of coils.

Figure 6:
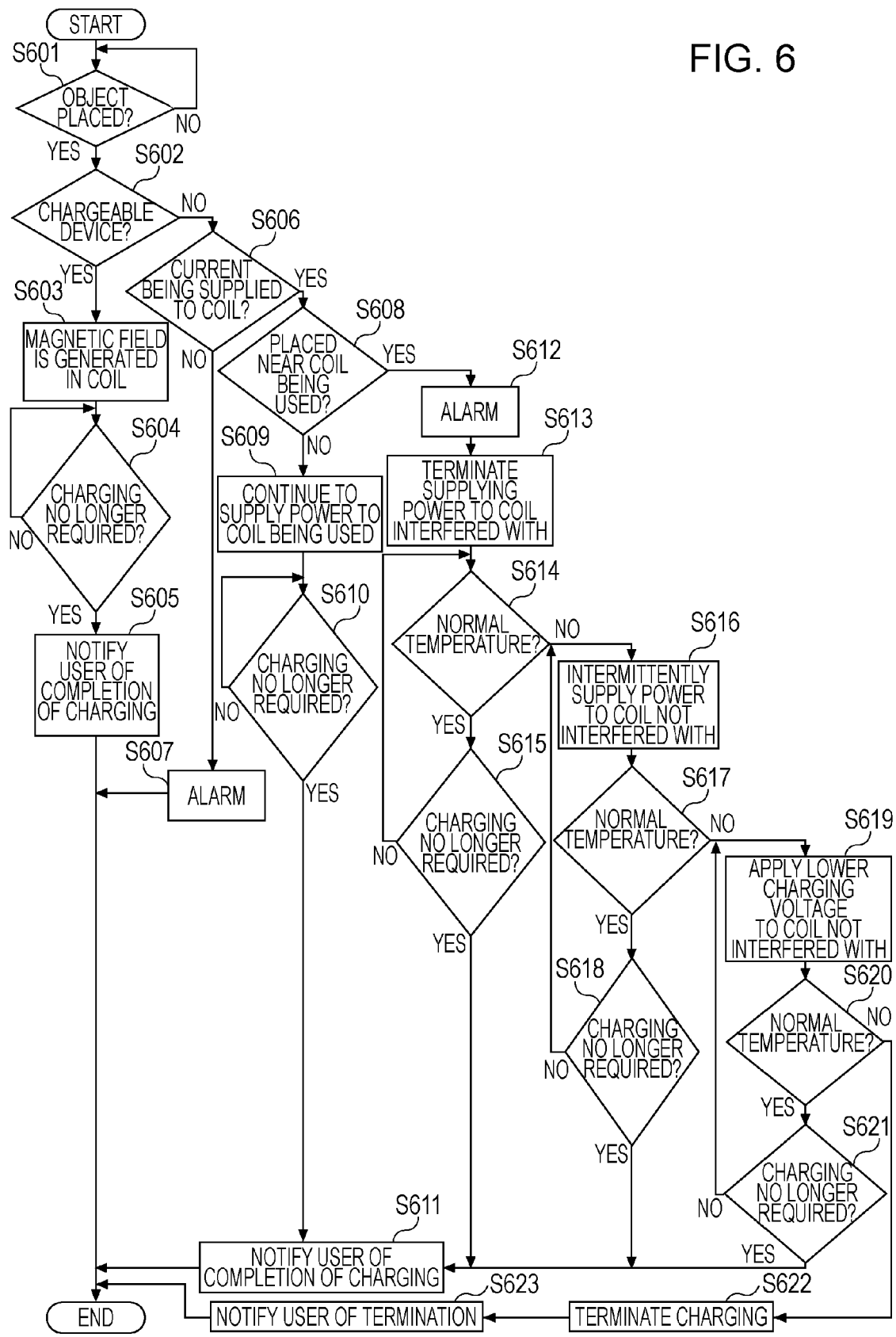
FIG. 6 is a flowchart showing the steps of a charging operation of the charging apparatus according to the second embodiment of the present invention.

Referring to FIGS. 5 and 6, a method for controlling a charging operation in the above-described charging apparatus 400 will now be described.

FIG. 6 is a flowchart showing the steps of a charging operation according to the present embodiment.

The charging apparatus 400 performs "IC authentication" when it detects that an object has been placed (YES in step S601). When the object is determined to be a chargeable device as the result of the "IC authentication" (YES in step S602), the control unit 501 causes an AC magnetic field to be generated in a coil near the position where the object has been placed, by controlling the charging controllers 502 to 507 (step S603). The AC magnetic field generated in the coil enables charging to be performed inside the placed chargeable device.

The detecting unit 212, during the charging, continues to send the current and voltage data of the coil to the control unit 501. When the device being charged no longer needs to be charged since the charging has finished, for example, the power consumed in the device being charged drops, which leads to a drop in current of the corresponding coil. The control unit 501, which detected the drop in current of the coil supplying power, determines that charging is no longer required. When a drop is not observed, it is determined that charging is still required (step S604).

When it is determined that charging is no longer required (YES in step S604), the control unit 501 controls the corresponding charging controller such that supplying of power to the coil is stopped, and instructs the display controller 209 to notify a user of completion of the charging operation. The display controller 209 makes the LED 104 blink, be turned on, or change the luminescent color, or makes the LCD panel 105 display a completion-of-charge message, for example (step S605). The completion of charging may be notified by means of display as described above, or may be notified by means of an audio message using a loudspeaker (not shown) etc.

When the object is determined to be a non-chargeable device as the result of the "IC authentication" (NO in step S602), the control unit 501 determines whether or not any of the charging controllers 502 to 507 is in a state of supplying a current to the corresponding coil (step S606). This is equivalent to determining whether or not AC magnetic fields have already been generated in some of the coils 401 to 406, or determining whether or not a certain chargeable device has already been placed in a state of being charged. An alarm message may be displayed which shows that a non-chargeable device or a foreign object has been placed, when the object is determined to be a non-chargeable device as the result of the "IC authentication" (NO in step S602).

When currents are not being supplied to the coils 401 to 406 (NO in step S606), the control unit 501 instructs the display controller 209 to display an alarm showing that a non-chargeable device or a foreign object has been placed (step S607). The display controller 209 makes the LED 104 blink, be turned on, or change the luminescent color to act as an alarm. Likewise, the LCD panel 105 displays a message acting as an alarm. The alarm may be realized by display as described above, or may be an audio message from a loudspeaker (not shown).

Assuming that power is being supplied to the coils 402 and 405, for example (YES in step S606), the control unit 501 determines whether or not the newly placed object has been placed apart from the coils already receiving power by a predetermined distance or more (step S608). The object detector 211 can detect the position of the newly placed object by detecting and comparing all the outputs of the Hall elements 107. Here, a predetermined distance means a distance beyond which a newly placed object, if made of metal, is unlikely to be heated, for example. This can be determined on the basis of experiments etc. Alternatively, the positional relationship may be checked as to whether or not the newly placed object disturbs electromagnetic induction being utilized by a device that is already being charged. This can also be determined on the basis of experiments etc.

When the distances between the newly placed object and the coils 402 and 405 in a state of charging are a predetermined distance or more (YES in step S608), the control unit 501 controls the charging controllers 503 and 506 such that power is continued to be supplied to the coils 402 and 405 (step S609).

When the device being charged no longer needs to be charged since the charging has finished, for example, the power consumed in the device being charged drops, which leads to a drop in current of the corresponding coils. The control unit 501, which detected the drops in current of the coils 402 and 405, determines that charging is no longer required. When a drop is not observed, it is determined that charging is still required (step S610).

When it is determined that charging is no longer required (YES in step S610), the control unit 501 controls the charging controllers 503 and 506 such that supplying of power to the coils 402 and 405 is stopped, and instructs the display controller 209 to notify a user of completion of the charging operation. The display controller 209 makes the LED 104 blink, be turned on, or change the luminescent color, or makes the LCD panel 105 display a completion-of-charge message, for example (step S611). The completion of charging may be notified by means of display as described above, or may be notified by means of an audio message using a loudspeaker (not shown) etc.

When the distances between the newly placed object and the coils 402 and 405 in a state of charging are less than a predetermined distance (YES in step S608), the control unit 501 instructs the display controller 209 to display an alarm showing that a non-chargeable device or a foreign object has been placed (step S612). The display controller 209 makes the LED 104 blink, be turned on, or change the luminescent color to act as an alarm. The LCD panel 105 displays a message acting as an alarm. The alarm may be realized by display as described above, or may be an audio message from a loudspeaker (not shown).

Assume that an object has been newly placed near the coil 402. Then the charging controller 503 is controlled by the control unit 501 to stop supplying power to the coil 402, which is within the predetermined distance from the newly placed object (step S613). In this case, by providing an LED etc. (not shown) near each coil, a user may be notified of the coil that has stopped receiving power using the illumination states of the LED. Alternatively, the LED 104 or the LCD panel 105 may be used to notify the user of which coil has stopped receiving power.

Next, the control unit 501 determines whether or not the temperatures of the device being charged and the newly placed object are abnormally high on the basis of temperatures detected by the temperature detector 210 (step S614). The determination is made on the basis of temperatures sensed by the thermistors 106 that are arranged near the position of the newly placed object detected in step S606. The condition determined to be abnormal may be a temperature equal to or higher than a predetermined value or a rate of increase in temperature equal to or higher than a predetermined value.

When the temperatures detected by the temperature detector 210 are normal (YES in step S614), the control unit 501 determines whether or not more charging is required on the basis of the voltage and current data of the coil 405 (step S615).

When it is determined that charging is no longer required (YES in step S615), the flow proceeds to step S611, where supplying of power to the coil 405 is stopped and completion of the charging operation is notified.

When the temperatures detected by the temperature detector 210 are abnormal (NO in step S614), the control unit 501 controls the charging controller 506 such that power is supplied intermittently to the coil 405 (step S616). At this time, the control unit 501 may instruct the display controller 209 to notify a user of intermittent charging by using the LED 104, the LCD panel 105, a loudspeaker (not shown), etc.

Next, the control unit 501 determines whether or not the temperatures of the device being charged and the newly placed object are abnormally high on the basis of the temperatures detected by the temperature detector 210 (step S617).

When the temperatures detected by the temperature detector 210 are normal (YES in step S617), the control unit 501 determines whether or not more charging is required on the basis of the voltage and current data of the coil 405 (step S618).

When it is determined that charging is no longer required (YES in step S618), the flow proceeds to step S611, where supplying of power to the coil 405 is stopped and completion of the charging operation is notified.

When the temperatures detected by the temperature detector 210 are abnormal (NO in step S617), the control unit 501 controls the charging controller 506 such that the voltage applied to the coil 405 becomes lower than before (step S619). At this time, the control unit 501 may instruct the display controller 209 to notify a user of lower-voltage charging by using the LED 104, the LCD panel 105, a loudspeaker (not shown), etc.

Next, the control unit 501 determines whether or not the temperatures of the device being charged and the newly placed object are abnormally high on the basis of the temperatures detected by the temperature detector 210 (step S620).

When the temperatures detected by the temperature detector 210 are normal (YES in step S620), the control unit 501 determines whether or not more charging is required on the basis of the voltage and current data of the coil 405 (step S621).

When it is determined that charging is no longer required (YES in step S621), the flow proceeds to step S611, where supplying of power to the coil 405 is stopped and completion of the charging operation is notified.

When the temperatures detected by the temperature detector 210 are abnormal (NO in step S620), the control unit 501 controls the charging controller 506 such that supplying of power to the coil 405 is terminated (step S622), and instructs the display controller 209 to notify a user that the charging operation has been terminated. The display controller 209 makes the LED 104 blink, be turned on, or change the luminescent color, or makes the LCD panel 105 display a termination-of-charging message, for example (step S623). The termination of charging may be notified by means of display as described above, or may be notified by means of an audio message using a loudspeaker (not shown) etc.

Note that the sequence of steps S612 to S615, the sequence of steps S616 to S618, and the sequence of steps S619 to S621 described above may be swapped with one another. Only one or two of these sequences of steps may also be used.

A charging apparatus according to the present embodiment can suppress heat generation even when a non-chargeable device or a foreign object is placed together with a chargeable device on the charging apparatus. Further, the possibility of unfavorably influencing the charging operation for a chargeable device can be lowered, and a chargeable device, if in a chargeable state, can be charged.

In the first and second embodiments, a device to be charged is placed on a charging apparatus; however, by making the chargeable apparatus stand on its side, a device to be charged may be placed near the coils, which are now arranged along the vertical surface of the charging apparatus. For instance a device to be charged may be placed on stands that are provided near the coils, or may be hanged using hangers such as hooks that are provided such that the device is placed near the coils. These ways of placement are also included in embodiments of the invention.

The method of contactless charging is not limited to the method of charging using electromagnetic induction as described in the embodiments. Other examples include a method of charging in which a radio wave transmitted from a charging apparatus is received with an antenna, and power is taken out from the received radio wave. Another example is a method of charging in which a charging apparatus produces a vibrating electric or magnetic field, which causes resonance in a resonant circuit provided in a device to be charged, allowing the device to take out power.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-057309 filed Mar. 7, 2008, which is hereby incorporated by reference herein in its entirety.

What is claimed is:

1. A charging apparatus comprising:
   a charging unit configured to perform a contactless charging process, wherein the contactless charging process includes a process for supplying power to an external device; and
   a control unit configured to perform a predetermined process for reducing a voltage supplied to the external device based on whether a distance between an object and the charging apparatus is less than a predetermined value if the contactless charging process is performed, wherein the object does not include a chargeable device.

2. The charging apparatus according to claim 1, wherein the control unit controls the charging unit to supply power to the external device intermittently based on whether the distance is less than the predetermined value if the contactless charging process is performed.

3. The charging apparatus according to claim 1, wherein the object does not include a unit that charges by using power received from the charging apparatus.

4. The charging apparatus according to claim 1, wherein the control unit controls the charging unit to stop the contactless charging process based on whether the distance is less than the predetermined value if the contactless charging process is performed.

5. The charging apparatus according to claim 1, further comprising an output unit that outputs information relating to the object if the distance is less than the predetermined value.

6. The charging apparatus according to claim 1, wherein the control unit stops the contactless charging process by using at least one of a current of the charging unit and a voltage of the charging unit if the contactless charging process is performed.

7. The charging apparatus according to claim 1, wherein the control unit performs the predetermined process if the contactless charging process is performed and the distance is less than the predetermined value.

8. The charging apparatus according to claim 1, further comprising a detector that detects a position of the object.

9. A charging apparatus comprising:
   a first charging unit configured to perform a contactless charging process, wherein the contactless charging process includes a process for supplying power to an external device;
   a second charging unit configured to perform the contactless charging process; and
   a control unit configured to reduce a voltage supplied to the external device based on whether a first distance between an object and the first charging unit is less than a predetermined value if the contactless charging process is performed by using the first charging unit, wherein the object does not include a chargeable device.

10. The charging apparatus according to claim 9, wherein the control unit stops supplying power to the external device via the first charging unit based on whether the first distance is less than the predetermined value if the contactless charging process is performed by using the first charging unit.

11. The charging apparatus according to claim 9, wherein the control unit controls the first charging unit to supply power to the external device intermittently based on whether the first distance is less than the predetermined value if the contactless charging process is performed by using the first charging unit.

12. The charging apparatus according to claim 9, wherein the object does not include a unit that charges by using power received from the charging apparatus.

13. The charging apparatus according to claim 9, further comprising an output unit that outputs information relating to the object if the first distance is less than the predetermined value.

14. The charging apparatus according to claim 9, wherein the control unit performs the contactless charging process by using the second charging unit if the first distance is less than the predetermined value and a second distance between the object and the second charging unit is not less than the predetermined value.

15. The charging apparatus according to claim 9, wherein the control unit stops the contactless charging process by using at least one of a current of the first charging unit and a voltage of the first charging unit if the contactless charging process is performed by using the first charging unit.

16. The charging apparatus according to claim 9, wherein the control unit performs the predetermined process if the contactless charging process is performed by the first charging unit and the first distance is less than the predetermined value.

17. The charging apparatus according to claim 9, further comprising a detector that detects a position of the object.

* * * * *